United States Patent [19]

Alcorn et al.

[11] Patent Number: 5,185,856
[45] Date of Patent: Feb. 9, 1993

[54] ARITHMETIC AND LOGIC PROCESSING UNIT FOR COMPUTER GRAPHICS SYSTEM

[75] Inventors: Byron A. Alcorn, Fort Collins; Robert W. Cherry, Loveland; Mark D. Coleman; Brian D. Rauchfuss, both of Fort Collins, all of Colo.

[73] Assignee: Hewlett-Packard Company, Palo Alto, Calif.

[21] Appl. No.: 495,005

[22] Filed: Mar. 16, 1990

[51] Int. Cl.$^5$ .............................................. G06F 15/62
[52] U.S. Cl. .................................... 395/130; 395/131; 395/164
[58] Field of Search ............... 364/518, 521, 736, 742, 364/754, 764, 768, 146; 395/130, 162, 164, 131

[56] References Cited

U.S. PATENT DOCUMENTS

| | | | |
|---|---|---|---|
| 4,488,258 | 12/1984 | Struger et al. | 364/146 X |
| 4,727,508 | 2/1988 | Williams | 364/768 |
| 4,916,531 | 4/1990 | Genz et al. | 364/764 X |
| 4,958,302 | 9/1990 | Fredrickson et al. | 364/521 |
| 5,012,163 | 4/1991 | Alcorn et al. | 364/521 X |

Primary Examiner—Gary V. Harkcom
Assistant Examiner—Mark K. Zimmerman
Attorney, Agent, or Firm—Guy J. Kelley

[57] ABSTRACT

Pixel arithmetic and logical units for rendering pixels in graphics systems. Circuits for performing arithmetic operations on raster scan data are provided. The circuits comprise opcode registers for selecting an arithmetic function which transforms pixel value data corresponding to graphics primitives, multiplication circuits interfaced with the opcode registers for multiplying graphics operators with graphics data to obtain transform pixel value data, combining circuits interfaced with the multiplication circuits for adding transform pixel value data to existing pixel value data and processing circuitry interfaced with the combining circuitry for storing overflow data from the combining circuitry when adding transform pixel data overflows the combining circuitry.

11 Claims, 3 Drawing Sheets

ARITHMETIC AND LOGIC PROCESSING UNIT FOR COMPUTER GRAPHICS SYSTEM

FIELD OF THE INVENTION

This invention relates to methods and apparatus for rendering graphics primitives to frame buffers in computer graphics systems. More specifically, this invention relates to methods and apparatus for performing arithmetic and logical operations in computer graphics systems.

BACKGROUND OF THE INVENTION

Computer graphics workstations can provide highly detailed graphics simulations for a variety of applications. Engineers and designers working in the computer aided design (CAD) and computer aided manufacturing (CAM) areas typically utilize graphics simulations for a variety of computational tasks. The computer graphics workstation industry has thus been driven to provide more powerful computer graphics workstations which can perform graphics simulations quickly and with increased detail.

Modern workstations having graphics capabilities generally utilize "window" systems to organize graphics manipulations. As the industry has been driven to provide faster and more detailed graphics capabilities, computer workstation engineers have tried to design high performance, multiple window systems which maintain a high degree of use interactivity with the graphics workstation.

A primary function of window systems in such graphics systems is to provide the user with simultaneous access to multiple processes on the workstation. Each of these processes provides an interface to the user through its own area onto the workstation display. The overall result for the user is an increase in productivity since the user can then manage more than one task at a time with multiple windows displaying multiple processes on the workstation.

In graphics systems, some scheme must be implemented to "render" or draw graphics primitives to the system's screen. "Graphics primitives" are a basic component of a graphics picture, such as a polygon, vector or spline. All graphics pictures are formed with combinations of these graphics primitives. Many schemes may be utilized to perform graphics primitives rendering.

The graphics rendering procedure generally takes place within a piece of graphics rendering hardware called a scan converter. The scan converter manipulates graphics primitives and converts them into picture elements or "pixels" for storage in a "frame buffer" memory. A frame buffer generally comprises a plurality of video random access memory (VRAM) computer chips which store information concerning pixel activation on the system's display screen corresponding to the particular graphics primitives which will be traced out on the screen. Generally, the frame buffer contains all of the pixel activation data, and stores this information so that the graphics system can trace this information on the workstation's screen. The frame buffer is generally dynamic and is periodically refreshed.

Thus, computer graphics systems convert image representations stored in the computer's memory to image representations which are easily understood by humans. The image representations are typically displayed on a cathode ray tube (CRT) device that is divided into arrays of pixel elements which can be stimulated to emit a range of colored light. The particular color of light that a pixel emits is called its "value." Display devices such as CRTs typically stimulate pixels sequentially in some regular order, such as left to right and top to bottom, and repeat the sequence 50 to 70 times a second to keep the screen refreshed. Thus, some mechanism is required to retain a pixel's value between the times that this value is used to stimulate the display. The frame buffer is typically used to provide this "refresh" function.

Since frame buffers are usually implemented as arrays of VRAMs, they are "bit mapped" such that pixel locations on a display device are assigned x,y coordinates on the frame buffer. A single VRAM device rarely has enough storage location to completely store all the x,y coordinates corresponding to pixel locations for the entire image on a display device, and therefore multiple VRAMs are generally used. The particular mapping algorithm used is a function of various factors, such as what particular VRAMs are available, how quickly the VRAM can be accessed compared to how quickly pixels can be rendered, how much hardware it takes to support a particular mapping, and other factors.

In high performance computer workstation systems, it is generally desirable to access as many pixels simultaneously as is practical. However, to access as many pixels simultaneously as possible implies that each VRAM cycle accesses all VRAMs. It generally desirable to provide rendered pixel data for all VRAMs. Furthermore, high-density VRAMs are generally much slower than the hardware that renders pixels. There is therefore a long-felt need in the art for computer graphics renderers and frame buffers which allow simultaneous access to as many pixels as are needed to render an image, thereby reducing the number of accesses required to the frame buffer to completely render the image and decreasing the time it takes to ultimately write a graphics primitive to the system's screen.

Typical CRT devices for use with graphics workstations are "raster scan" display devices. Typical raster scan display devices generate images comprising a multiplicity of parallel, non-overlapping bands of pixels comprising sets of parallel lines. An example of such a system is disclosed in U.S. Pat. No. 4,695,772, Lau et al. The raster scan device disclosed in the Lau et al. patent is organized as an array of tiles. See Lau et al, col. 2, line 36. Raster scan devices generally utilize a multiplicity of beams for the red, green and blue (RGB) channels in the CRT. The multiplicity of beams generally write from the left side of the display CRT to the right side of the display CRT.

Typically, rendering algorithms calculate consecutive pixel values for consecutive pixels with small changes in their x,y addresses from pixel to pixel. This means that there is a large degree of "coherency" in the pixel addresses. When arranging VRAMs for simultaneous pixel access, it is desirable that the pixels that are accessed are allowed to be highly coherent.

Prior rendering schemes to generate pixel values sequentially generate all the pixels that make up a primitive, such as a polygon. Each primitive that comprises an image representation is used sequentially to generate pixel values. Therefore, a group of pixel values is generated which is stored in the frame buffer VRAMs. The x,y addresses of at least one of the pixels of a primitive is used to determine what row and column address should be applied to the VRAMs. Then, all the pixels in the groups so generated can be stored in a tile stored in the appropriate VRAMs. However, not all pixels in the group are accessible with a first tile access, and therefore additional tiles must be accessed from the frame buffer in order for the system to write a primitive to a CRT.

Certain prior graphics pipeline systems may utilize a "pixel cache" which functions as an intermediate storage memory for pixel data which will be written to the frame buffer. The pixel cache generally also connects the frame buffer to the rest of the graphics pipeline system and may, in certain instances, provide certain low level rendering procedures before writing the data to a frame buffer. Prior pixel caches in computer graphics systems typically are not utilized to provide high level processing of pixel data, but merely function as a temporary storage unit for data that is read out of the frame buffer VRAMs. An example of graphics system utilizing a pixel cache is the TURBO SRX graphics system provided by the Hewlett Packard Graphics Technology division, Fort Collins, Colo.

There is a long-felt need in the art for an intermediate pixel cache storage memory which can provide high level processing of pixel value data corresponding to graphics primitives. Such a pixel cache has not heretofore been provided in the computer graphics art. The inventors of the subject matter herein claimed and disclosed have invented novel pixel cache devices and methods which greatly enhance the speed at which graphics rendering to the frame buffer is accomplished, and which also greatly enhance rendering efficiency.

SUMMARY OF THE INVENTION

Methods and apparatus provided in accordance with the present invention solve the aforementioned long-felt needs in the art for pixel caches which greatly enhance the speed and efficiency of graphics primitives rendering in a computer graphics system. In accordance with the present invention, a circuit for performing arithmetic operations on raster scan data comprises opcode means for selecting an arithmetic function which transforms pixel value data corresponding to graphics primitives, multiplication means interfaced with the opcode means for multiplying graphics operations with graphics data to obtain transformed pixel value data, combining means interfaced with multiplication means for adding transformed pixel value data to existing pixel value data, and processing means interfaced with the combining means for storing overflow data from the combining means when adding transformed pixel value data overflows the combining means.

Further in accordance with the present invention, methods for processing pixel data in a graphics system are provided. The methods comprise the steps of writing pixel data to a cache memory wherein the pixels are organized into tiles in the cache memory, performing arithmetic raster operations on the pixel data one pixel at a time, performing boolean operations on the pixel data one tile at a tile, writing the pixel data back to the cache memory, and rendering the pixel data to a graphics frame buffer.

DETAILED DESCRIPTION OF PREFERRED EMBODIMENTS

Figure 1:
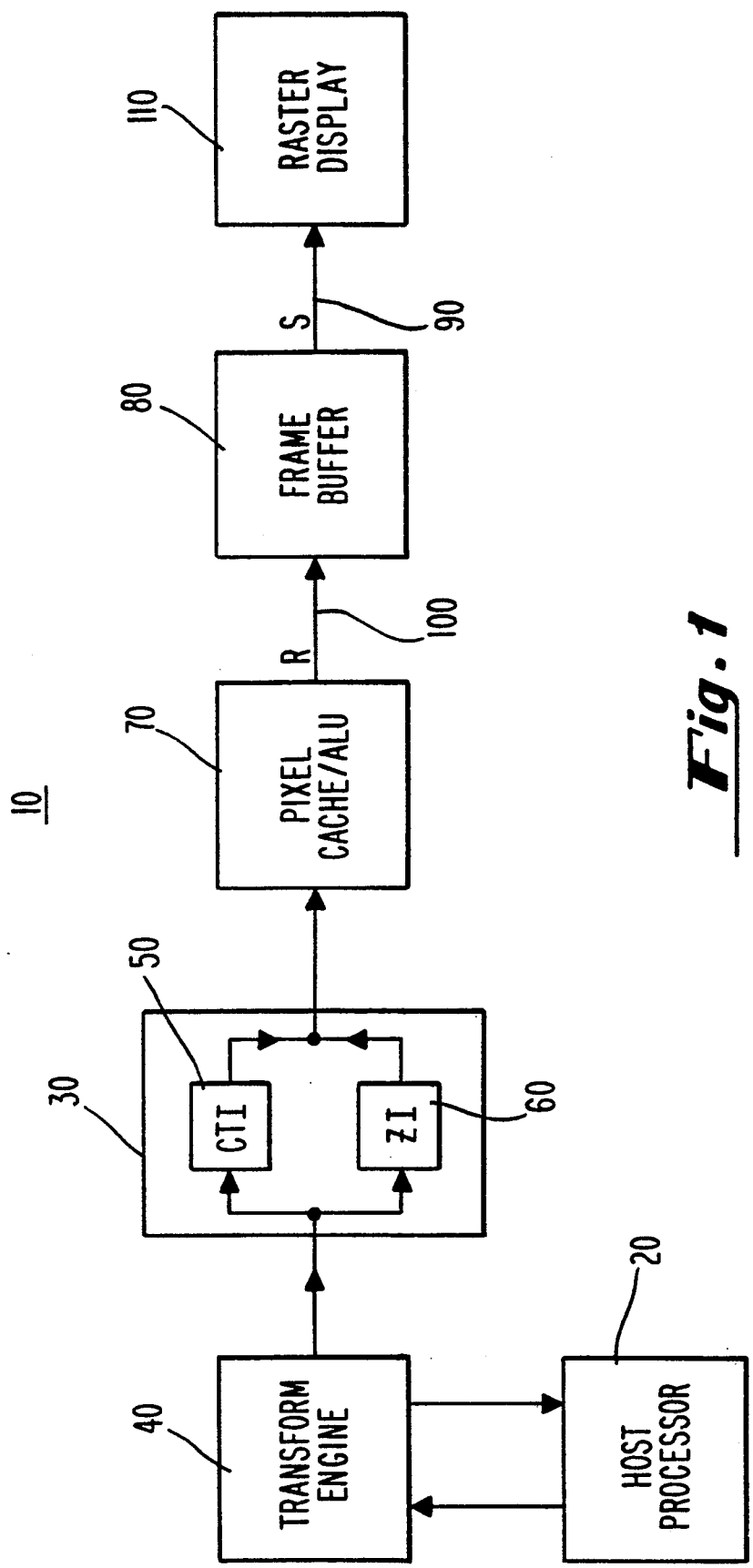
FIG. 1 is a block diagram of a pipeline graphics system for rendering graphics primitives to a raster type display device.

Referring now to the drawings wherein like reference numerals refer to like elements, FIG. 1 shows a frame buffer graphics system generally at 10. The host processor 20 generally comprises a high performance CPU, cache memory, a system memory, and a bus adapter. Host processor 20 runs the graphics system's operating system utilizing various graphics libraries.

The host processor 20 transfers commands and data, including textures, to a transform engine 40 or directly to the frame buffer 80. As commands are received from the graphics host processor, they are dispatched to transform engine 40 which is generally microcoded to perform the traditional tasks of viewing transforms, lighting calculations, clipping, radiosity, and other graphics functions. Interfaced with transform engine 40 is a scan converter 30 which preferably comprises a color texture interpolator (CTI) 50 and a Z interpolator ZI 60. In preferred embodiments, rasterization of graphics primitives is performed by CTI 50 and ZI 60. The CTI simultaneously interprets a number of pixel parameters, for example, red, green and blue (RGB), specular and diffuse parameters, alpha (x,y) parameters, and texture parameters; while the ZI only interpolates x, y and z values.

After rasterization is accomplished by the CTI 50 and the ZI 60, a pixel cache/arithmetical logic unit (ALU) 70 provided in accordance with the present invention performs various graphics functions such as, for example, gamma correction, dithering, z compares, window clipping, and blending of pixel color values with data previously stored in frame buffer 80. In preferred embodiments, frame buffer 80 generally comprises dual port video random access memory (VRAM) chips. A serial port 90 provides raster display update and a random port 100 provides new graphics primitives data to the frame buffer 110.

In still further preferred embodiments frame buffer 80 comprises 24 planes of 2048×1024 pixels. There are generally eight planes each of red, green and blue pixels. The offscreen frame buffer is used for texture storage, font storage, retained raster storage, and information used by windows in graphics pipeline 10. In yet further preferred embodiments, graphics system 10 is a pipelined architecture wherein the various pieces of hardware provided along the pipeline perform complex graphics manipulations of the graphics primitives. The host processor 20 is further interfaced with the pixel cache/ALU 70 along a pipeline bypass, not shown. The output of the VRAM arrays in frame buffer 80 drives color maps which in turn drive digital to analog converters in the raster display 110.

In yet further preferred embodiments, pixel cache/ALU 70, frame buffer 80 and an address generator (not shown) form a frame buffer subsystem which is used in texture mapping. Many types of textures can be specified and stored by host processor 20. Additionally, a myriad of other graphics commands may be specified along the pipeline graphics system 10 by host processor 20.

Pixel cache/ALU 70 receives perspective correct RGB diffuse and RGB specular data which are generated by CTI 50 and downloaded. In further preferred embodiments, pixel cache/ALU 70 combines light source data with the particular texture color and forms the image pixel color value, and performs blending, antialiased vectors, antialiased polygons, texture mapping, radiosity support, alpha transparency, image compositing, Z buffering, window clipping, and dual interpolation of the diffuse and specular RGB data. All of these graphics operations, which comprise both arithmetic operations and boolean or logic operation, are then stored in the pixel cache after the aforementioned transforms are performed for eventual writing to frame buffer 80.

Figure 2:
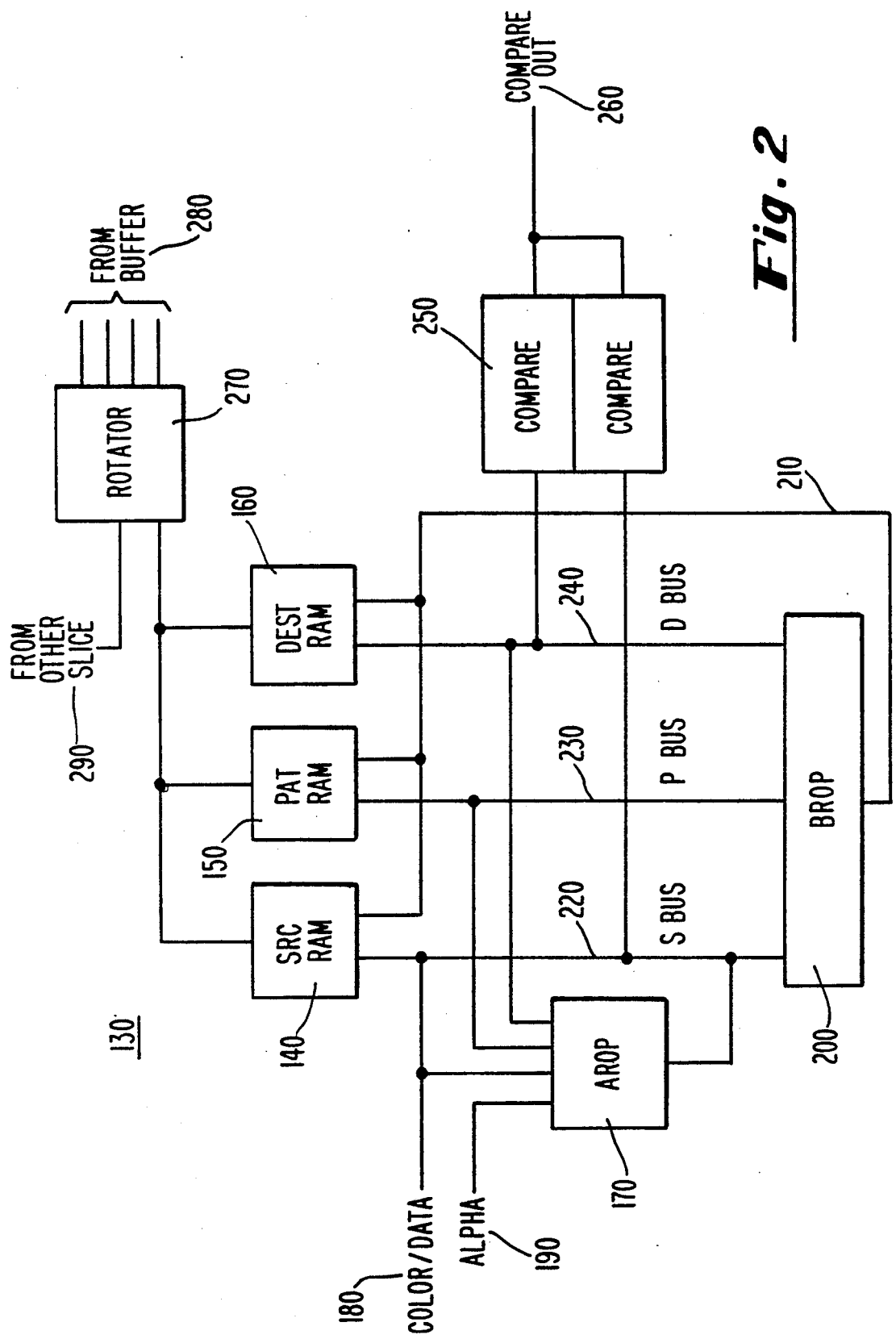
FIG. 2 is a block diagram of an arithmetic/logic unit provided in accordance with the present invention in a pixel cache/ALU.

Referring to FIG. 2, an ALU provided in accordance with the invention is shown generally at 130. In preferred embodiments, ALU 130 is part of a pixel cache which may also comprise other external memory devices. In still further preferred embodiments, a plurality of ALUs 130 may be found in one pixel cache chip, depending on the type and nature of the graphics system which employs a pixel cache/ALU in accordance with the present invention. Each of the ALUs 130 may be referred to as "slices" and thus a plurality of slices may be available to the pixel cache/ALU chip.

Each slice 130 preferably comprises three pixel tile caches defined as a source cache 140, a pattern cache 150, and a destination cache 160. Caches 140, 150 and 160 in preferred embodiments comprise random access memory chips which are adapted to store 32 pixels of data. In still further preferred embodiments, the pixels are organized in the caches 140, 150 and 160 in eight tiles which comprise four pixels per tile.

The source cache 140 stores pixel value data corresponding to the source area on the frame buffer. Similarly, the destination cache 160 stores destination data for the window on the frame buffer to which the pixel will be moved. It will be understood that the source and destination areas may be located in the same window or may in fact be separate source and destination windows. The pattern cache 150 in preferred embodiments stores a particular pattern which will be combined with the pixel value data in the source or destination caches and which will be eventually stored on the frame buffer or some other pixel data storage device.

In still further preferred embodiments, an arithmetic raster operation unit (AROP) 170 is interfaced in slice 130 to the source, pattern and destination caches 140, 150 and 160. AROP 170 is adapted in accordance with the present invention to perform a number of operations which involve the tile caches 140, 150 and 160, or the data and alpha input ports shown respectively at 180 and 190.

The data port 180 carries pixel color data to the AROP 170 while the alpha port 190 in preferred embodiments carries additional data necessary for blending. Data which is bussed through color data port 180 and alpha port 190 arrives from a source such as, for example, the host processor wherein graphics commands are output through the system for processing in the pixel cache and slice 130. In still further preferred embodiments, AROP 170 is further adapted to only perform arithmetic operations on a single pixel at a time stored in the tile caches 140, 150 and 160.

Further interfaced in slice 130 with the tile caches is a boolean raster operation (BROP) unit 200. BROP 200 is adapted in accordance with the present invention to perform logical operations involving boolean equations with data stored in the tile caches 140, 150 and 160. In still further embodiments, BROP 200 may operate on either one or four pixels, or on four pixels representing a whole tile of pixel value data.

BROP 200 provides replacement rules which are dependent upon specified inputs. In still further preferred embodiments, BROP 200 is a replacement rule register that describes the output of the function for the eight possible states of the three operands, source, pattern and destination, corresponding to the source, pattern and destination caches 140, 150 and 160. In accordance with the present invention, the general function of the BROP is:

| Input | | | Output |
|---|---|---|---|
| P | S | D | RR Register |
| 0 | 0 | 0 | msb |
| 0 | 0 | 1 | — |
| 0 | 1 | 0 | — |
| 0 | 1 | 1 | — |
| 1 | 0 | 0 | — |
| 1 | 0 | 1 | — |
| 1 | 1 | 0 | — |
| 1 | 1 | 1 | lsb | where the MSB is the most significant bit of the replacement register for the BROP and LSB is the least significant bit of the replacement register for the BROP. The output can be bussed along an output bus 210 to the source, pattern or destination caches.

A plurality of busses are provided to the slice 130 to interconnect AROP 170, BROP 200, and the caches 140, 150 and 160. A source bus 220, pattern bus 230, and destination bus 240 interconnect BROP 200 and AROP 170 to the source, pattern and destination caches. A compare circuit 250 provides a compare output 260 which can be used by the frame buffer during pixel value rendering to accomplish window compares and Z compares. Additionally, a rotator circuit 270 which is directly interfaced with the frame buffer at 280 and other slices at 290 provides pixel value data rotated into the frame buffer.

The results from AROP 170 and BROP 200 can be written back to any of the three tile caches 140, 150 and 160. In further embodiments, the particular cache written to will be controlled by a frame buffer controller. In general, there are three types of operations performed by the pixel cache: rendering, block moves, and compares. During the rendering operation, a tile is read from the frame buffer into the destination cache 160 and the corresponding pixels are received from a graphics system pixel processor which may comprise CTI 50 and ZI 60.

The pixels are combined with the destination tile, the pattern data and/or alpha data, which is loaded into pattern cache 150, and then loaded back into the destination cache 160 to be written back to the frame buffer. In yet further embodiments, four pixels are written or read at once and AROP 170 only processes one pixel at a time. In this fashion, destination cache 160 is used as a staging buffer. In preferred embodiments, a mask register is provided to the slice which allows specified planes to be used in the Z compare and window compare operations. Preferably, the pattern to be combined with the pixels can either be stored in the frame buffer and later loaded into the pattern cache, or a small pattern can be directly downloaded from the pixel processor.

During block move operations, pattern cache 150 is first loaded with 32 pixels per slice (8 tiles × 4 pixels per tile). Similarly, source cache 140 is then loaded and the destination cache 160 is loaded when they are to be used in a block move operation. Each tile which is to be processed is then written from the frame buffer to destination cache 160. After the tiles are filled in destination cache 160, they are written back to the frame buffer through horizontal and vertical alignment rotators found in rotation circuit 280 which align the tiles to the correct scan line and the particular pixel on the raster scan display.

In general, z compare operations may occur only during rendering. The old z values are read into the destination cache 160 and a pixel port then supplies data from ZI 60 which is used to compare. The two values are then sent through a comparator whose result indicates whether the compared values are greater than or equal to the original values which are output to the frame buffer.

Window operations in slice 130 may occur both during rendering and during block moves. During rendering, the identifier of a window being written to is stored in a destination window identifier register which is a separate register in slice 130. The destination window ID is then compared to the window ID of the pixel being written in the destination cache and the result is output on a line to the frame buffer.

During block moves, the window ID of the pixel being read may then be compared to the number in a source window ID register which is a separate register in slice 130. The source register is preferably compared to the source pixel in the source cache and the destination register is preferably compared to the destination pixel in the destination cache. If both are equal, then the equal line or "EQ" is set to "true." Additionally, mask registers may be used to specify which bits are part of the window ID and may be used to ensure that the source and the destination compares always give equal as a result.

Figure 3:
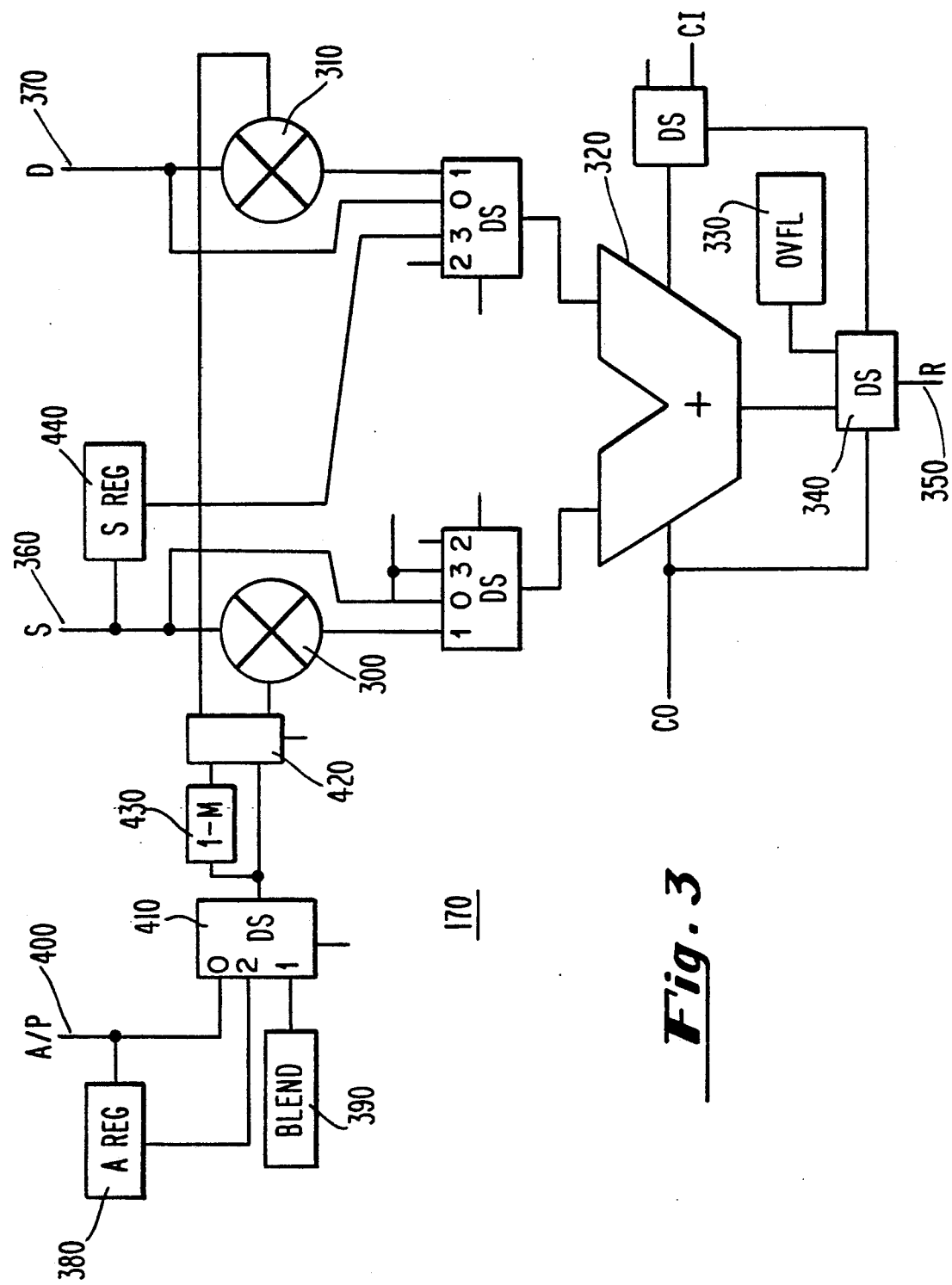
FIG. 3 is a block diagram of an arithmetic raster operational processor provided in accordance with the present invention for performing arithmetic operations on pixel value data.

Referring to FIG. 3, a block diagram of AROP 170 is illustrated. In preferred embodiments, AROP 170 comprises two multipliers shown respectively at 300 and 310. A combining circuit means 320 in further preferred embodiment is a 10-bit adder. Additionally, overflow circuitry 330 is provided interfaced with a data selector register 340 which replaces adder 320 results with an overflow value if the adder produces a carry out bit. The output of the circuit or the result of the AROP operations is generally output at 350 for further processing prior to being written back to one of the storage caches.

In still further preferred embodiments, each operand of adder 320 may be selected from one of four possible inputs. Each of the operands which function as an input is data from the source register flowing into multiplier 300 at port 360 (S), or data from the destination register flowing into multiplier 310 at port 370 (D). The S or D inputs are multiplied with alpha data stored in an A register 380, or data from a blend register corresponding to texture blending of a graphics primitive at 390, or pixel port data from the pixel processor. Thus the second input is generally blend input data or alpha or pattern (A/P) data shown generally at 400. This second input first passes through a data selector 410 controlled by the opcode registers. The third possible input to the adder may be simply be zero, and the fourth input generally supports texture and radiosity data.

The two multipliers 300 and 310 receive inputs from either the A/P port 400 or blend register 390 and the S or D port 360 and 370. Multiplier 300 has the blend input complemented to provide an approximation of a blend factor 1-M functions. The complementing and 1-M functions are shown generally at 420 and 430 respectively. In preferred embodiments, the M blend factor is downloaded from the host processor to AROP 170 and may be swapped between the multipliers as controlled by an operational code (OPCODE) register which is a control register within the pixel cache. The opcode register (not shown in FIG. 3) controls data traverse through the AROP 170.

The four AROP inputs to the pixel cache itself allow a set of sixteen possible arithmetic functions. In further preferred embodiments of AROPs provided in accordance with the present invention, sixteen possible functions are provided. These sixteen functions allow the most common blending and rendering operations to be performed in a single pass (machine cycle) of the AROP. More complex functions may be implemented in more than one pass by switching AROP lines between states. Preferably, when the AROP inputs to the multipliers are set to zero, the opcode is taken from the OPCODE register which allows any possible function to be implemented. In yet further preferred embodiments, a multiplier bypass will allow direct writing of the frame buffer with no error which would be otherwise introduced by multiplying 255/256.

AROP 170 is essentially an asynchronous data path in which the result of an arithmetic function selected by the OPCODE is generated from the inputs selected and is latched at the end of a clock cycle. Control of the AROP data path is provided through the opcode register 430 which provides data to the alpha or pattern (A/P) bus, the source bus (S) and the destination bus (D). The AROP allows for selection of the sixteen possible arithmetic functions to be performed by the AROP.

AROP 170 is a versatile and efficient unit and a short description of the possible sixteen arithmetic functions is useful for an understanding of its capabilities. The first of these sixteen operations comprises taking the OPCODE from the opcode register and data path registers. Since the AROP is not necessarily hardwired to the control unit, the opcode to be applied to the arithmetic unit is taken from the opcode register and the S and A/P busses of the arithmetic unit take data from sources as described in the data path register. This allows for fast multipass functions for AROP 170.

The second arithmetic function can be described as taking one byte of data from the source cache 140 which can then be moved, unmodified, to the same byte tile location of a different cache, such as the source, pattern or destination cache. This allows for the application of correction factors such as gamma, degamma, and dither in AROP 170 without first blending the pixel data. With this arithmetic function, window clips can be performed on a per byte basis as a parallel function.

A third arithmetic function provided in accordance with the present invention comprises taking data from the destination cache 160 which can then be moved, unmodified, to the same byte tile location of a different cache. Similarly, this allows application of other correction factors such as gamma, degamma and dither in AROP 170 without first blending the pixel data.

The fourth arithmetic operation performed by AROP 170 comprises adding a source pixel to a destination pixel without scaling, written to the same byte tile address of the particular cache addressed with cache lines. This arithmetic raster operation function may be used for any multipass function where intermediate results have been created, and stored temporarily in the source and destination. The intermediate results may then be added together. This allows implementation of more complex compositing functions for antialiased images.

The fifth arithmetic operation turns adder 320 into an 8-bit adder and propagates carry bits to the other slices off the chip. A carry-in bit is received from off-chip and this allows the user to chain adders together to build a 32-bit adder which is needed for radiosity support. The 32-bit adder resulting from this special mode is used to sum form factors for each polygon.

A sixth arithmetic raster operating function which is utilized by slice 170 is a blending of images during a block move with a blend factor derived from the blend register 390. The contents of the blend register divided by 256 of the image source data is added to 255 minus the blend register contents divided by 256 of image destination data. This resultant image is placed in memory. AROP 170 uses this resultant image for general image blending or transparency and antialiased polygons.

A seventh arithmetic operation utilized by AROP 170 is a compositing mode during a single pass of the data path. During this mode, new pixel data is composited with old pixel data using new alpha data to generate antialiased vectors. This arithmetic operation gives good antialiased vector performance and will give good antialiased vectors for most conditions.

An eighth arithmetic function utilized by AROP 170 is a function which places pixel color data from a pixel processor to one of the tile caches addressed and unmodified. Since the BROP 200 is in serial with AROP 170, a boolean raster operation can then be applied to the data. This function may be used for general rendering.

A ninth arithmetic operation is a blending operation which is a modification of the blending equation, with a blending factor taken from the alpha port data register 380. This arithmetic function is used for the texture mapping case where a texture-mapped image with specular highlights must be blended into the old (destination) image. Once the texture image has been generated in a previous cycle and temporarily stored in a source cache, this arithmetic function blends the image with the destination using the alpha values stored in the A register 380. This function is generally useful for a second pass in texture map cycles.

A tenth arithmetic function takes new pixel color data from the pixel port to be added to the old destination image. This function is similar to the fourth arithmetic function delineated above except that pixel data from the pixel port is added to the intermediate result stored in destination cache 160. In preferred embodiments, this function is used for the third pass in a 3-pass texture map cycle where specular highlights are added after the textured image is blended with the destination image. The specular data is then added to the textured image temporarily stored in destination cache 160.

An eleventh arithmetic function occurs when AROP 170 sources an 8-bit operand from pattern cache 150, which is generally the texture, and applies the 8-bit operand to new image data determined by the eighth arithmetic function described above. The resulting data is then added with the contents of an S register shown generally in FIG. 3 at 430. S register 430 contains specular data for the pixels. The eleventh arithmetic function is used in the first pass of a texture map where specular data are added prior to blending.

A twelfth arithmetic operation performed by AROP 170 is simply a first-pass case for specular highlights which are not enabled or where the specular data are intended to be added after the blending operation.

A thirteenth arithmetic function adds a source image to a scaled destination image using the blend register 390's value as a scaling factor. This arithmetic function can be used for volumetric rendering where the image in the frame buffer is scaled and the new image is added to the scaled image. In preferred embodiments this arithmetic function could also be used to generate complex functions in several arithmetic passes.

A fourteenth arithmetic function utilized by AROP 170 is a complementary function to the thirteenth function discussed above except that new data comprising both color and a scaling factor are taken from the pixel port instead of the S cache 140 and blend register 390. The host processor can scale data in the frame buffer and add a new value to it using this arithmetic function. This function may be used for volumetric rendering applications and could also be used to generate more complex functions in several arithmetic passes. A fifteenth arithmetic provides antialiasing for light vectors over a dark background, and a sixteenth arithmetic function can be used for compositing forms using old alpha data in several passes.

It will be recognized by those with skill in the art that many other types of arithmetic functions could be added for use with AROP 170 in a pixel cache ALU provided in accordance with the present invention. AROP 170 is believed generally useful for supporting many types of arithmetic functions and may be slightly modified to support higher order registers and opcodes.

Overflow register 330 is provided to AROP 170 to provide for correctness of the final image by forcing the resultant value of the AROP unit to be limited to two values. The lower limit value is set in the architecture at the value zero since the adder cannot "underflow," that is, it always adds. The upper limit is created by the combined action of the carry bit of the adder, and the overflow replacement value is written into the overflow register 330. The value of the overflow value can be set to the maximum which would cause AROP 170 to generate a realistic intensity such as those found in real world structures, that is, white light added to white light equals white light. The overflow value may also be set to some unique color which may be chosen by the user and can then be used as an "error" indicator to the programmer when certain conditions are exceeded.

AROP 170 is designed to have a hybrid control structure that allows high performance application of up to, in preferred embodiments, 256 different arithmetic functions intermixed with any one of the additional sixteen. The fixed functions are chosen to provide maximum performance for functionality, while giving flexibility of the programmable AROP allows for complete user flexibility. When the four inputs of AROP 170 are set to zero, any valid cycle in the pixel ports will perform the arithmetic function programmed in the internal opcode register 430. A valid cycle when the four ports are set to other than zero will perform any of the other sixteen functions. In preferred embodiments, operations can be switched between any of the sixteen possible functions on a clock by clock basis.

There have thus been described certain preferred embodiments of arithmetic logic units provided in accordance with the present invention. While preferred embodiments have been described and disclosed, it will be recognized by those with skill in the art that modifications are within the true spirit and scope of the invention. The appended claims are intended to cover all such modifications.

What is claimed is:

1. A circuit for performing arithmetic operations on raster scan graphics data, comprising:
   opcode means for selecting an arithmetic function;
   data source means for providing graphics data;
   bus means for bussing data from said data source means;
   a blend register for storing a blend factor;
   an alpha register for storing an alpha value;
   a data selector coupled to said blend register and said alpha register and responsive to said opcode means in selecting between said blend factor and said alpha value and outputting the selected data;
   complementing means for complementing the output of said data selector;
   multiplication means for multiplying an output of said complementing means with graphics data from said data source means in accordance with an arithmetic function selected by said opcode means to obtain transformed pixel value data;
   combining means interfaced with the multiplication means for adding transformed pixel value data to other pixel value data from said data source means; and
   processing means interfaced with the combining means for storing overflow data from the combining means when said combining means overflows.

2. The circuit recited in claim 1, wherein said data source means comprises:
   pixel alpha port means, coupled to said data selector, for providing antialiased vector data and pixel transparency data to the circuit; and
   pixel cache means interfaced with the bus means for providing pixel data to the circuit.

3. The circuit recited in claim 2 wherein the processing means comprises overflow register means for replacing a value in the combining means when circuit operation forces the combining means to generate a carry bit.

4. A data storage device for temporary storage of pixel data in a computer graphics system, comprising:
   arithmetic operating means for performing arithmetic raster operations on pixel data;
   cache means interfaced with said arithmetic operating means for storing said pixel data, said cache means comprising source cache means for storing pixel data corresponding to pixel locations on a source area, destination cache means for storing pixel data corresponding to pixel locations on a destination area, and pattern cache means for storing pattern or texture map data; and
   logic means interfaced with the cache means for performing boolean operations on the pixel, pattern or texture map data.

5. The data storage device recited in claim 4 wherein the source, destination and pattern cache means comprise memory buffers adapted to store data corresponding to 32 pixels on a raster scan display device.

6. The data storage device recited in claim 5 further comprising rotation means interfaced with the source cache means, destination cache means and the pattern cache means for horizontally and vertically aligning pixel data when said pixel data is transferred from said source, destination and pattern cache means to a frame buffer such that said pixel data, when in said frame buffer, will correspond to a prescribed scan line and pixel.

7. The data storage device recited in claim 6 wherein the arithmetic operating means is adapted to perform arithmetic operations on pixel value data one pixel at a time.

8. The data storage device recited in claim 7 further comprising:
   a first data bus interfaced with the source cache means for busing source window data to the logic means;
   a second data bus interfaced with the destination cache means for busing destination window data to the logic means; and
   a third data bus interfaced with the pattern cache means for busing pattern data to the logic means.

9. The data storage device recited in claim 8, further comprising at least one bus which buses data from said cache means to said arithmetic operating means and logic means.

10. The data storage device recited in claim 4 wherein said arithmetic operating means comprises:
    opcode means for selecting an arithmetic function;
    an alpha register for storing an alpha value;
    a blend register for storing a blend factor;
    a data selector coupled to said alpha register and said blend register and responsive to said opcode means in selecting between said blend factor and said alpha value and outputting the selected data;
    complementing means for complementing the output of said data selector;
    multiplication means for multiplying an output of said complementing means with graphics data from said cache means in accordance with an arithmetic function selected by said opcode means to obtain transformed pixel value data;
    combining means interfaced with the multiplication means for adding transformed pixel value data to other pixel value data from said cache means; and
    processing means interfaced with the combining means for storing overflow data from the combining means when said combining means overflows.

11. The data storage device recited in claim 9 further comprising a blend register interfaced with the bus for storing a blend factor to be used by said arithmetic operating means in transforming data provided by said cache means.

* * * * *